(12) United States Patent
Matsuo (10) Patent No.: US 8,823,653 B2
(45) Date of Patent: Sep. 2, 2014

(54) CAPACITIVE INPUT DEVICE

(75) Inventor: Mutsumi Matsuo, Azumino (JP)

(73) Assignee: Japan Display West Inc., Chita-gun, Aichi-ken (JP)

( * ) Notice: Subject to any disclaimer, the term of this patent is extended or adjusted under 35 U.S.C. 154(b) by 1301 days.

(21) Appl. No.: 12/057,865

(22) Filed: Mar. 28, 2008

(65) Prior Publication Data
US 2008/0309635 A1    Dec. 18, 2008

(30) Foreign Application Priority Data

Jun. 14, 2007 (JP) ................. 2007-157115

(51) Int. Cl.
*G06F 3/041* (2006.01)

(52) U.S. Cl.
USPC .......................................... 345/173

(58) Field of Classification Search
None
See application file for complete search history.

(56) References Cited

U.S. PATENT DOCUMENTS

| 6,970,160 | B2 * | 11/2005 | Mulligan et al. ............ 345/173 |
| 8,373,664 | B2 * | 2/2013 | Wright .......................... 345/173 |
| 2003/0234769 | A1 * | 12/2003 | Cross et al. .................. 345/173 |
| 2006/0045963 | A1 * | 3/2006 | Hirai et al. ................... 427/96.1 |
| 2008/0309633 | A1 * | 12/2008 | Hotelling et al. ............ 345/173 |
| 2009/0244028 | A1 * | 10/2009 | Matsuo ......................... 345/174 |

FOREIGN PATENT DOCUMENTS

| JP | 58-166437 | 10/1983 |
| JP | 60-075927 | 4/1985 |
| JP | 2002-287902 | 10/2002 |
| JP | 2003-004902 | 1/2003 |
| JP | 2003-257253 | 9/2003 |
| JP | 2007-122326 | 5/2007 |
| WO | 2005-040901 | 5/2005 |

\* cited by examiner

*Primary Examiner* — Seokyun Moon
(74) *Attorney, Agent, or Firm* — K&L Gates LLP (57) ABSTRACT

A capacitive input device includes a translucent substrate; first translucent electrode lines, extending in a first direction; second translucent electrode lines, extending in a second direction intersecting with the first direction; interlayer insulating layers; and relay electrodes. The first translucent electrode lines intersect with the second translucent electrode lines at intersecting portions. Portions of one of each first translucent electrode line and each second translucent electrode line are connected to each other with the intersecting portions. Portions of the other are separated from each other with the intersecting portions. The translucent interlayer insulating layers overlie the first or second translucent electrode line portions connected to each other with the intersecting portions. The translucent relay electrodes overlie the interlayer insulating layers to electrically connect the first or second translucent electrode line portions, separated from each other with the intersecting portions, to each other.

6 Claims, 8 Drawing Sheets

CAPACITIVE INPUT DEVICE

The entire disclosure of Japanese Patent Application No. 2007-157115, filed Jun. 14, 2007 is expressly incorporated by reference herein.

BACKGROUND

1. Technical Field

The present invention relates to a capacitive input device capable of detecting a position touched by a human finger as a change in capacitance.

2. Related Art

Recent electronic apparatuses such as mobile phones, car navigation systems, personal computers, ticket-vending machines, and banking terminals include tablet input devices disposed on liquid crystal displays. With reference to instruction images displayed on image display regions of the liquid crystal displays, information relating to the instruction images can be input into the electronic apparatuses by the touch of human fingers to the image display regions.

Examples of such input devices include resistive touch panels and capacitive touch panels. The resistive touch panels have a two-layer structure including a glass sheet and a film, which is pressed down to make a short circuit. Therefore, the resistive touch panels have disadvantages that they have a narrow operational temperature range and deteriorate with time.

On the other hand, the capacitive touch panels have an advantage that they have a simple structure including a substrate and a translucent conductive film disposed thereon. For example, JP-A-2007-122326 discloses a capacitive input device including electrode lines extending in directions intersecting with each other. The capacitive input device detects a change in the capacitance between the electrode lines touched by a human finger to identify an input position.

Another type of capacitive input device detects an input position in such a manner that an in-phase, equipotential alternating current is applied between both ends of a translucent conductive film and a weak current generated by the formation of a capacitor due to the approach or touch of a human finger to the translucent conductive film.

There is a problem in that a process for manufacturing the following device is complicated: a capacitive input device that includes a translucent substrate, a plurality of first translucent electrode lines which extend in a first direction and which are disposed on the front surface of the translucent substrate, and a plurality of second translucent electrode lines which extend in a second direction intersecting with the first direction and which are disposed on the rear surface of the translucent substrate.

In input devices, images displayed on liquid crystal displays are viewed through entry screens and therefore, highly translucent substrates and electrode lines are used. When regions containing the translucent electrode lines have a reflectivity significantly different from that of regions containing no translucent electrode lines, the presence of the translucent electrode lines is conspicuous, which is not preferable. On the other hand, the first and second translucent electrode lines are disposed on the front surface and rear surface, respectively, of the translucent substrate, that is, the translucent substrate is located between the first and second translucent electrode lines. Therefore, a region containing the first translucent electrode lines, a region containing the second translucent electrode lines, and a region containing no translucent electrode line are different in optical architecture from each other. This results in large differences in reflectivity between these regions to cause a problem that the first and second translucent electrode lines are conspicuous.

SUMMARY

An advantage of an aspect of the invention is to provide a capacitive input device which can be manufactured by a simple process and in which electrode lines on a translucent substrate and intersecting portions between the electrode lines are inconspicuous.

A capacitive input device according to the present invention includes a translucent substrate having an input region; first translucent electrode lines, arranged in the input region, extending in a first direction; second translucent electrode lines, arranged in the input region, extending in a second direction intersecting with the first direction; interlayer insulating layers; and relay electrodes. The first and second translucent electrode lines are disposed on a surface of the translucent substrate. The first translucent electrode lines intersect with the second translucent electrode lines at intersecting portions. Portions of one of each first translucent electrode line and each second translucent electrode line are connected to each other with the intersecting portions. Portions of the other are separated from each other with the intersecting portions. The translucent interlayer insulating layers overlie the first or second translucent electrode line portions connected to each other with the intersecting portions. The translucent relay electrodes overlie the interlayer insulating layers to electrically connect the first or second translucent electrode line portions, separated from each other with the intersecting portions, to each other.

In the capacitive input device, the first and second translucent electrode lines are arranged on one surface of the translucent substrate. Therefore, the capacitive input device can be manufactured by a simpler process as compared to capacitive input devices including first translucent electrode lines and second translucent electrode lines disposed on the front surfaces and rear surfaces, respectively, of translucent substrates. The first and second translucent electrode lines are arranged on one surface of the translucent substrate and therefore intersect with each other at the intersecting portions; hence, the intersecting portions are different in configuration from the first and second translucent electrode lines. This may cause the intersecting portions to be conspicuous when an image displayed on a liquid crystal display including the capacitive input device is viewed through an input screen included in the capacitive input device, even if the first and second translucent electrode lines are formed such that there is only a small difference in reflectivity between a region containing the first and second translucent electrode lines and a region containing no first and second translucent electrode lines and therefore the first and second translucent electrode lines are inconspicuous. However, the intersecting portions can be prevented from being visually identified. This is because the first or second translucent electrode line portions separated from each other with the intersecting portions are electrically connected to each other with the translucent relay electrodes, which overlie the interlayer insulating layers, and the intersecting portions have a small area and a configuration in which translucent thin-films are stacked. According to the present invention, the intersecting portions are inconspicuous when the intersecting portions are viewed through an input screen included in the capacitive input device; hence, a high-quality image can be displayed on an image generator disposed on the rear side of the capacitive input device.

In the capacitive input device, the first and second translucent electrode lines are preferably formed from the same member. Therefore, the capacitive input device can be manufactured by a simpler process as compared to capacitive input devices including first and second translucent electrode lines formed from different members.

In the capacitive input device, it is preferable that the first and second translucent electrode lines have first large-area portions and second large-area portions, respectively, each located between the intersecting portions and the relay electrodes and the first or second translucent electrode line portions connected to each other with the intersecting portions be narrower than the first and second large-area portions. The presence of the first and second large-area portions allows an input position to be precisely detected. Since the relay electrodes and the first or second translucent electrode line portions connected to each other with the intersecting portions are narrower than the first and second large-area portions, the intersecting portions are inconspicuous.

In the capacitive input device, the first and second translucent electrode lines are preferably formed from a multilayer film including translucent thin-films having different refractive indexes. This leads to a reduction in the difference in reflectivity between the region containing the first and second translucent electrode lines and the region containing no first and second translucent electrode lines; hence, the first and second translucent electrode lines are inconspicuous when the capacitive input device is viewed from the input screen side. In general, the light traveling from a medium with a small refractive index to a medium with a large refractive index is reflected by the interface between the media. Since the first and second translucent electrode lines are arranged on the translucent substrate, the following interfaces are present: the interface between each first or second translucent electrode line and an air layer located on the input screen side and the interface between the translucent substrate and the first or second translucent electrode line; hence, there is a difference in reflectivity between the region containing the first and second translucent electrode lines and the region containing no first and second translucent electrode lines. This may cause the first and second translucent electrode lines to be conspicuous. The difference in reflectivity between the region containing the first and second translucent electrode lines and the region containing no first and second translucent electrode lines can be eliminated in such a manner that the phases of portions of the light reflected by the interfaces are set to be opposite to each other. This allows the first and second translucent electrode lines to be inconspicuous.

In the capacitive input device, one of the translucent thin-films may be a translucent conductive metal oxide layer and another one thereof may be a translucent silicon compound layer. The translucent conductive metal oxide layer is made of, for example, indium tin oxide (hereinafter referred to as ITO) or indium zinc oxide (hereinafter referred to as IZO). The translucent silicon compound layer is made of, for example, silicon dioxide or silicon nitride.

In the capacitive input device, the translucent substrate may be made of glass and the multilayer film may include a first ITO layer with a thickness of about 10 to 20 nm, a silicon dioxide layer with a thickness of about 40 to 60 nm, and a second ITO layer with a thickness of about 10 to 20 nm, these layers being arranged in that order.

In the capacitive input device, the relay electrodes may each include a translucent conductive metal oxide film such as an ITO film with a thickness of about 10 to 15 nm.

The capacitive input device may further include a plurality of metal wires which are connected to the first and second translucent electrode lines and which extend outside the input region. This leads to a reduction in wiring resistance.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the present invention will now be described with reference to the accompanying drawings. In the drawings, in order to show layers and members on a recognizable scale, different scales are used depending on the size of the layers and members.

First Embodiment

Figure 1A:
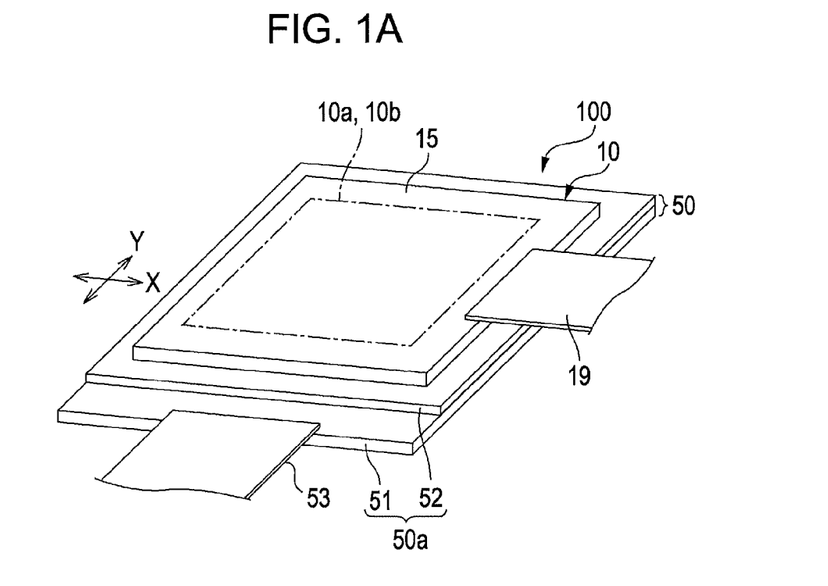
FIG. 1A is schematic view of a display unit including a capacitive input device according to a first embodiment of the present invention.
Figure 1B:
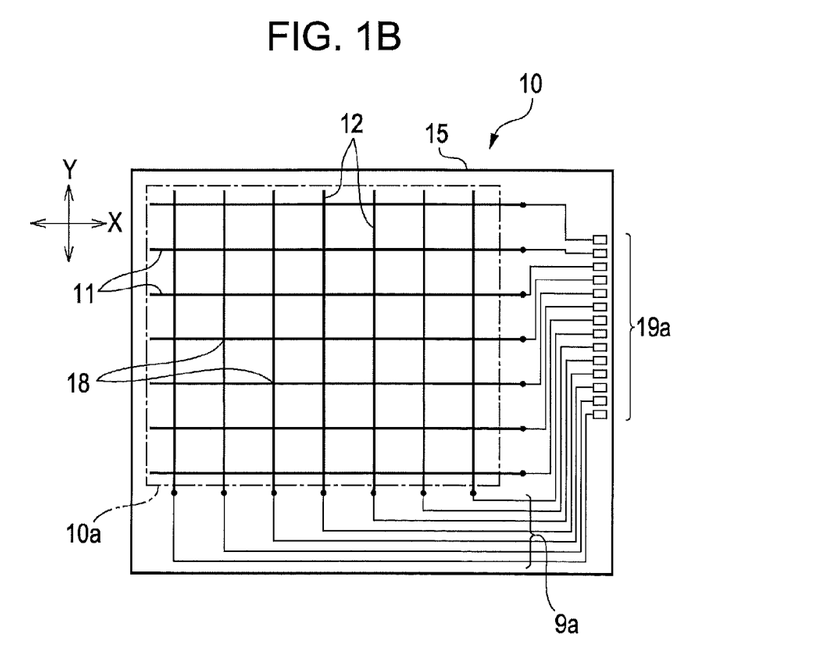
FIG. 1B is a plan view of the display unit.

FIG. 1A is schematic view of a display unit 100. FIG. 1B is a plan view of the display unit 100. With reference to FIG. 1B, solid lines simply represent electrode lines, of which the number is less than that of actual electrode lines.

With reference to FIG. 1A, the display unit 100 includes a panel-shaped capacitive input device 10 according to a first embodiment of the present invention and a liquid crystal display 50 functioning as an image generator. The liquid crystal display 50 has a first surface through which light is emitted. The capacitive input device 10 is disposed on the first surface of the liquid crystal display 50. The liquid crystal display 50 includes an active matrix-type liquid crystal display panel 50a that is transmissive, reflective, or transflective. When the liquid crystal display panel 50a is transmissive or transflective, a backlight (not shown) is placed on the side opposite to the first surface. The liquid crystal display 50 further includes a retardation film and/or polarization film (not shown) disposed on the liquid crystal display panel 50a. The liquid crystal display panel 50a includes an array substrate 51, a counter substrate 52 opposed to the array substrate 51, and a liquid crystal layer disposed between the array substrate 51 and the counter substrate 52. The array substrate 51 has a projecting region which projects outside the counter substrate 52 and which is connected to a first flexible substrate 53. Driving ICs may be COG-mounted on the array substrate 51. The liquid crystal display 50 can display a video or still image. When information is input into the capacitive input device 10, the liquid crystal display 50 displays an instruction image corresponding to the input information. Therefore, a user can input information into the capacitive input device 10 by touching the displayed instruction image with his or her finger.

The capacitive input device 10 is a type of touch panel and includes a translucent substrate 15 and a second flexible substrate 19 connected to an end portion of the translucent substrate 15. The second flexible substrate 19 is also connected to a driving circuit (not shown) for allowing the capacitive input device 10 to detect an input position. In the capacitive input device 10, the upper surface of the translucent substrate 15 functions as an input screen 10b. The input screen 10b has an input region 10a which is located at substantially the center thereof and which is touched by user's finger.

With reference to FIG. 1B, a plurality of first translucent electrode lines 11 and second translucent electrode lines 12 are arranged in the input region 10a. The first translucent electrode lines 11 extend in a first direction indicated by Arrow X. The second translucent electrode lines 12 extend in a second direction, indicated by Arrow Y, intersecting with the first direction.

If user's finger, which is conductive, touches portions of the first and second translucent electrode lines 11 and 12 in such a state that the first and second translucent electrode lines 11 and 12 are supplied with voltages and therefore are charged, capacitors are formed between user's finger and the first and second translucent electrode lines 11 and 12. This results in a reduction in capacitance. Therefore, the capacitive input device 10 can detect the portions touched by user's finger.

Figure 2:
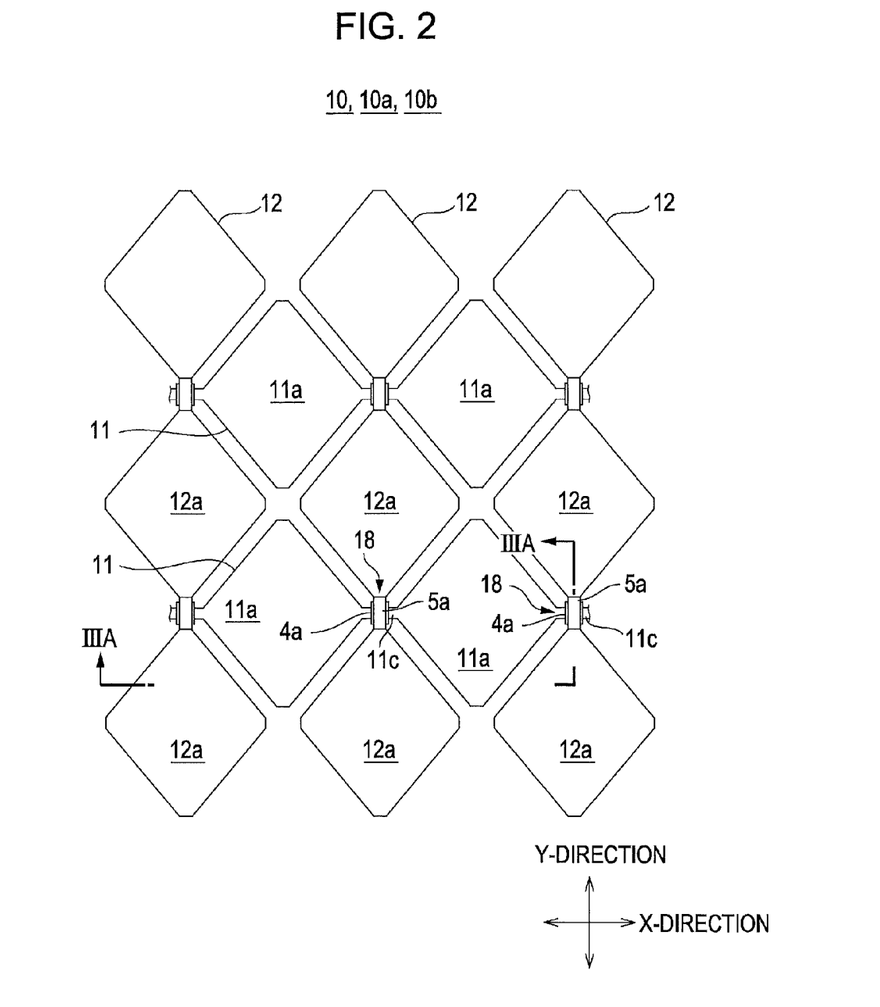
FIG. 2 is a plan view showing the arrangement of first and second translucent electrode lines included in the capacitive input device.
Figure 3A:
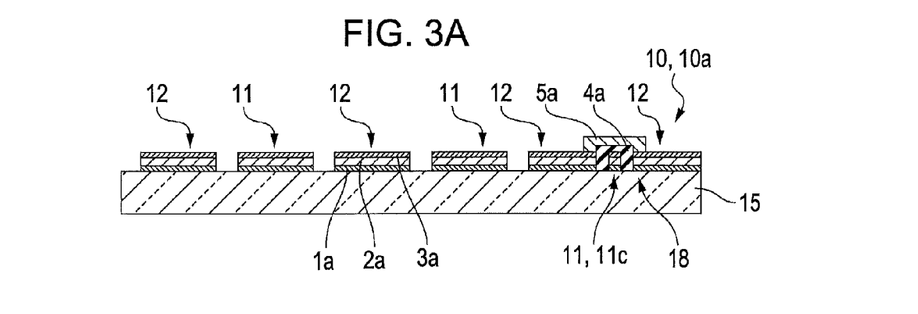
FIG. 3A is a sectional view of the capacitive input device taken along the line IIIA-IIIA of FIG. 2.
Figure 3B:
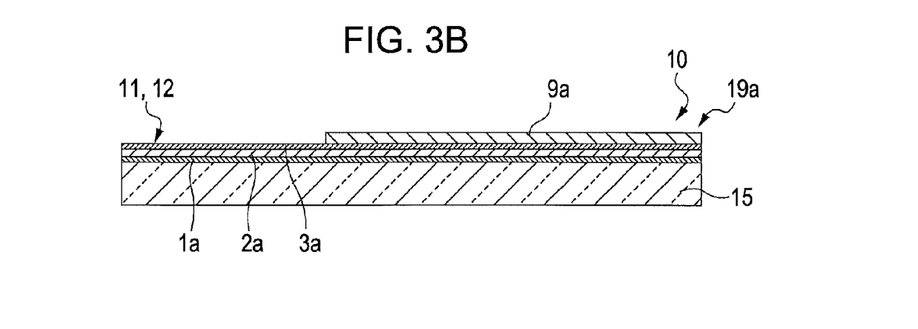
FIG. 3B is a sectional view showing connections between the first and second translucent electrode lines and metal wires.
Figure 3C:
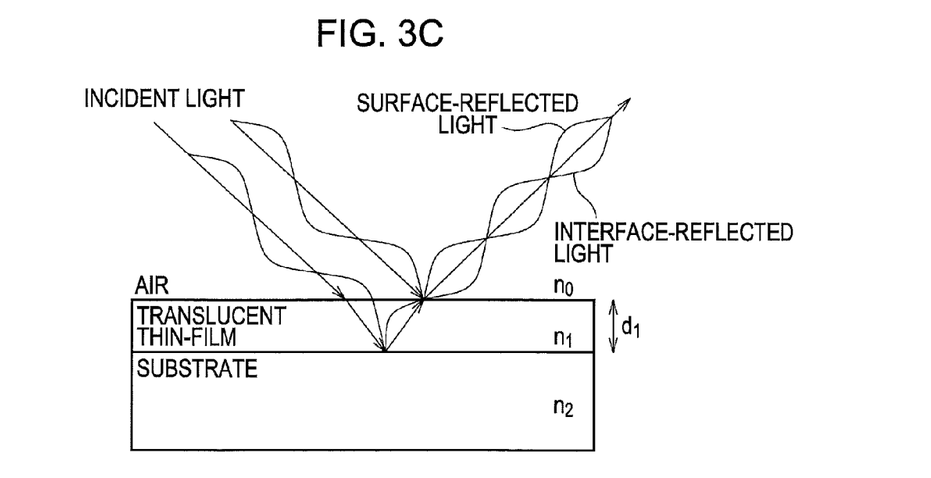
FIG. 3C is an illustration showing an antireflection technique making use of optical interference.

The configuration of the capacitive input device 10 will now be described in detail. FIG. 2 is a plan view showing the arrangement of the first and second translucent electrode lines 11 and 12. FIG. 2 shows only portions of the first and second translucent electrode lines 11 and 12. FIG. 3A is a sectional view of the capacitive input device 10 taken along the line IIIA-IIIA of FIG. 2. FIG. 3B is a sectional view showing connections between the first and second translucent electrode lines 11 and 12 and metal wires 9a. FIG. 3C is an illustration showing an antireflection technique making use of optical interference.

With reference to FIGS. 1B, 2, and 3A, the first and second translucent electrode lines 11 and 12 are disposed on the upper surface of the translucent substrate 15 and each include the same layer. The first translucent electrode lines 11 intersect with the second translucent electrode lines 12 at intersecting portions 18.

Portions of one of each first translucent electrode line 11 and each second translucent electrode line 12 may be connected to each other with the intersecting portions 18 and portions of the other may be separated from each other with the intersecting portions 18. In this embodiment, portions of the first translucent electrode lines 11 are connected to each other with the intersecting portions 18 and portions of the second translucent electrode lines 12 are separated from each other with the intersecting portions 18.

Translucent interlayer insulating layers 4a overlie the first translucent electrode line 11 portions connected to each other with the intersecting portions 18. Translucent relay electrodes 5a overlie the interlayer insulating layers 4a to electrically connect the second translucent electrode line 12 portions, separated from each other with the intersecting portions 18, to each other. Therefore, the second translucent electrode line 12 portions are electrically connected to each other in the second direction.

The first and second translucent electrode lines 11 and 12 have first pad portions 11a and second pad portions 12a (large-area portions), respectively. The first and second pad portions 11a and 12a are each located between the intersecting portions 18, have a relatively large area, and are rhombic. The first translucent electrode lines 11 have connecting portions 11c which extend through the intersecting portions 18 and which are narrower than the first pad portions 11a. The relay electrodes 5a have a strip shape and are narrower than the first and second pad portions 11a and 12a.

With reference to FIGS. 1A, 1B, and 3B, the metal wires 9a extend outside the input region 10a and are electrically connected to the first and second translucent electrode lines 11 and 12. The metal wires 9a have terminals 19a, located at ends thereof, connected to the second flexible substrate 19.

The capacitive input device 10 has a region containing the first and second translucent electrode lines 11 and 12 and a region containing no first and second translucent electrode lines 11 and 12. The region containing the first and second translucent electrode lines 11 and 12 has a reflectivity different from that of the region containing no first and second translucent electrode lines 11 and 12. This may cause a problem that the first and second translucent electrode lines 11 and 12 are visually identified due to the difference in reflectivity between the region containing the first and second translucent electrode lines 11 and 12 and the region containing no first and second translucent electrode lines 11 and 12. In order to prevent the problem, a material for forming the first and second translucent electrode lines 11 and 12 and the thickness of a layer of the material are determined on the basis of the antireflection technique, which makes use of optical interference as described below with reference to FIG. 3C.

The antireflection technique is as follows: in the case where a portion of the light incident on a thin-film is reflected by a surface of the thin-film and another portion of the incident light is reflected by the interface between the thin-film and a substrate disposed thereunder, the phase of the interface-reflected light portion is set to be opposite to that of the surface-reflected light portion, so that the interface-reflected light portion counteracts the surface reflected light portion and therefore reflected light is reduced. The thin-film has a reflectivity of zero when the following equations hold:

$$(n_1)^2 = n_0 \times n_2$$

$$n_1 \times d_1 = \lambda/4$$

wherein $n_0$ represents the refractive index of air, $n_1$ represents the refractive index of the thin-film, $n_2$ represents the refractive index of the substrate, $d_1$ represents the thickness of the thin-film, and $\lambda$ represents the wavelength of the incident light. The antireflection of the thin-film depends on the wavelength of the incident light and the thickness of the thin-film. The results of an optical simulation have shown that the first and second translucent electrode lines 11 and 12 can be prevented from being visually identified in such a manner that the first and second translucent electrode lines 11 and 12 are formed so as to have a multilayer structure including translucent thin-films having different refractive indexes, for example, a multilayer structure including translucent conductive metal oxide layer and a translucent silicon compound layer such that there is no difference in reflectivity between the region containing the first and second translucent electrode lines 11 and 12 and the region containing no first and second translucent electrode lines 11 and 12.

In this embodiment, the translucent substrate 15 is made of glass and has a refractive index of about 1.52. The first and second translucent electrode lines 11 and 12 each include a first ITO layer 1a having a thickness of about 10 to 20 nm and a refractive index of about 1.80, a silicon dioxide layer 2a having a thickness of about 40 to 60 nm and a refractive index of about 1.46, and a second ITO layer 3a having a thickness of about 10 to 20 nm and a refractive index of about 1.80, these layers being arranged in that order. In particular, the first ITO layer 1a, the silicon dioxide layer 2a, and the second ITO layer 3a have a thickness of about 10, 40, and 10 nm, respectively, or about 15, 50, and 15 nm, respectively.

In the capacitive input device 10, the relay electrodes 5a are connected to the second ITO layers 3a of the second translucent electrode lines 12. The metal wires 9a are connected to the second ITO layers 3a of the first and second translucent electrode lines 11 and 12.

The relay electrodes 5a each include a thin ITO film having a thickness of about 10 to 15 nm. The interlayer insulating layers 4a are made of a photosensitive resin such as an acrylic resin and have a thickness of about 1 to 2 μm and a refractive index of about 1.52. The relay electrodes 5a are narrow and have a small area; hence, the relay electrodes 5a are inconspicuous.

A method for manufacturing the capacitive input device 10 will now be described. FIGS. 4A to 4E are sectional views showing steps of the method. The first and second translucent electrode lines 11 and 12, the intersecting portions 18, and the metal wires 9a are collectively shown in FIGS. 4A to 4E. Left portions of FIGS. 4A to 4E correspond to FIG. 3A and right portions thereof correspond to FIG. 3B.

Figure 4A:
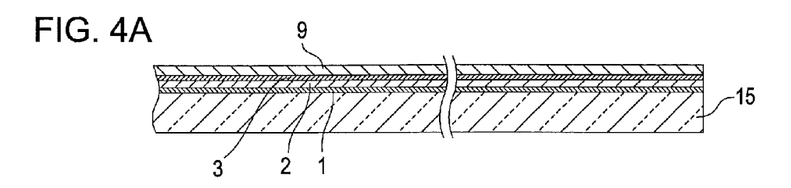
FIGS. 4A to 4E are sectional views showing steps of a method for manufacturing the capacitive input device.

In the manufacture of the capacitive input device 10, the following films are first formed on a surface of the translucent substrate 15 in this order as shown in FIG. 4A: a polycrystalline first ITO film 1 with a thickness of about 10 to 20 nm, a silicon dioxide film 2 with a thickness of about 40 to 60 nm, a polycrystalline second ITO film 3 with a thickness of about 10 to 20 nm, and a metal film 9.

Figure 4B:
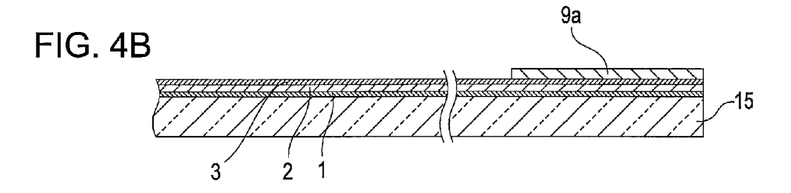

After a first etching mask made of a photosensitive resin or the like is provided on the metal film 9, the metal film 9 is patterned by etching, whereby the metal wires 9a are formed as shown in FIG. 4B. The first etching mask is then removed from the metal wires 9a.

Figure 4C:
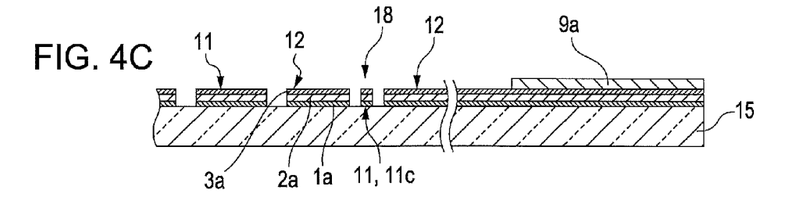

After a second etching mask made of a photosensitive resin or the like is applied over the metal wires 9a and the second ITO film 3, the first ITO film 1, the silicon dioxide film 2, the second ITO film 3 are etched, whereby the first and second translucent electrode lines 11 and 12 are formed as shown in FIG. 4C. The second etching mask is then removed from the metal wires 9a. The first pad portions 11a are connected to each other with the connecting portions 11c, which extend through the intersecting portions 18. The second pad portions 12a are separated from each other with the intersecting portions 18.

Figure 4D:
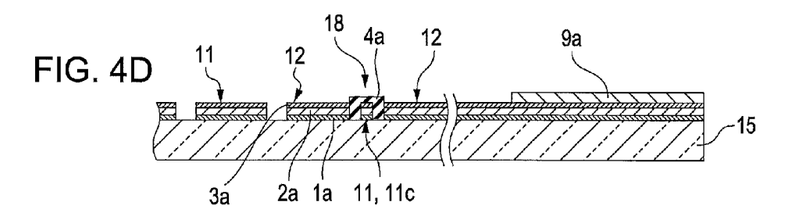

An acrylic resin is applied over the first and second translucent electrode lines 11 and 12 by a coating process, exposed, and then developed, whereby the interlayer insulating layers 4a are formed so as to cover the connecting portions 11c as shown in FIG. 4D.

Figure 4E:
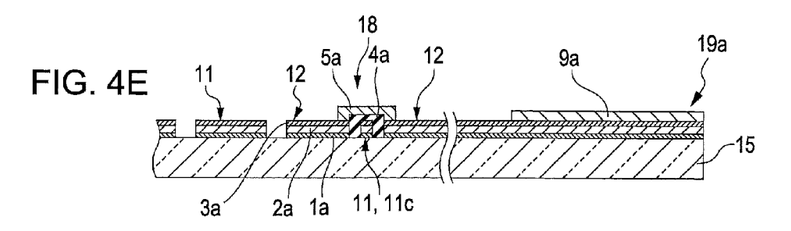

An amorphous ITO film is formed over the interlayer insulating layers 4a, a third etching mask made of a photosensitive resin or the like is provided on the amorphous ITO film, and the amorphous ITO film is then etched, whereby the relay electrodes 5a are formed on the interlayer insulating layers 4a so as to connect the second pad portions 12a to each other as shown in FIG. 4E. The relay electrodes 5a are fired at 200° C. or more for 20 to 30 minutes, whereby amorphous ITO in the relay electrodes 5a is transformed into polycrystalline ITO. In particular, the firing temperature of the relay electrodes 5a is, for example, 220° C. Amorphous ITO can be etched with oxalic acid but polycrystalline ITO cannot be etched with oxalic acid. Therefore, the second ITO layers 3a, which are included in the first and second translucent electrode lines 11 and 12, are prevented from being damaged even if oxalic acid is used to form the relay electrodes 5a by etching. ITO in the fired relay electrodes 5a is polycrystalline; hence, the relay electrodes 5a have a reduced electric resistance.

Advantages of this embodiment will now be described. Since the first and second translucent electrode lines 11 and 12 have the multilayer structure as described above, there is no difference in reflectivity between the region containing the first and second translucent electrode lines 11 and 12 and the region containing no first and second translucent electrode lines 11 and 12. The translucent substrate 15 is made of glass and the first and second translucent electrode lines 11 and 12 include the first ITO layers 1a, which have a thickness of about 10 to 20 nm, the silicon dioxide layers 2a, which have a thickness of about 40 to 60 nm, and the second ITO layers 3a, which have a thickness of about 10 to 20 nm; hence, the phases of portions of the light reflected by the interfaces between these layers are opposite to each other and therefore the reflected light disappears. Since there is no difference in reflectivity between the region containing the first and second translucent electrode lines 11 and 12 and the region containing no first and second translucent electrode lines 11 and 12, the first and second translucent electrode lines 11 and 12 can be prevented from being visually identified.

The first and second translucent electrode lines 11 and 12 have the first and second pad portions 11a and 12a, respectively, which have a large area and therefore are conspicuous. However, the first and second translucent electrode lines 11 and 12 can be prevented from being visually identified because of the multilayer structure thereof.

The first and second translucent electrode lines 11 and 12 are arranged on one surface of the translucent substrate 15; hence, the method of this embodiment is simpler than a method including a step of forming the first and second translucent electrode lines 11 and 12 on the front surface and rear surface, respectively, of the translucent substrate 15. The first and second translucent electrode lines 11 and 12 are formed from the same member; hence, the method of this embodiment is simpler than a method including a step of forming the first and second translucent electrode lines 11 and 12 from different members.

The first and second translucent electrode lines 11 and 12 are formed as described above and intersect with each other; hence, the intersecting portions 18 are different in configuration from the first and second translucent electrode lines 11 and 12. This may cause the intersecting portions 18 to be conspicuous. However, the intersecting portions 18 are prevented from being visually identified because the connecting portions 11c and the relay electrodes 5a, which are used to electrically connect the second pad portions 12a to each other, have a small width and therefore the intersecting portions 18 have a small area. The relay electrodes 5a are made of ITO and have a thickness of about 10 to 15 nm and the interlayer insulating layers 4a are made of the acrylic resin; hence, the intersecting portions 18 are inconspicuous. Since the intersecting portions 18 are inconspicuous, an image displayed on the liquid crystal display 50 has high quality even if the image is viewed through the input screen 10b.

Second Embodiment

Figure 5:
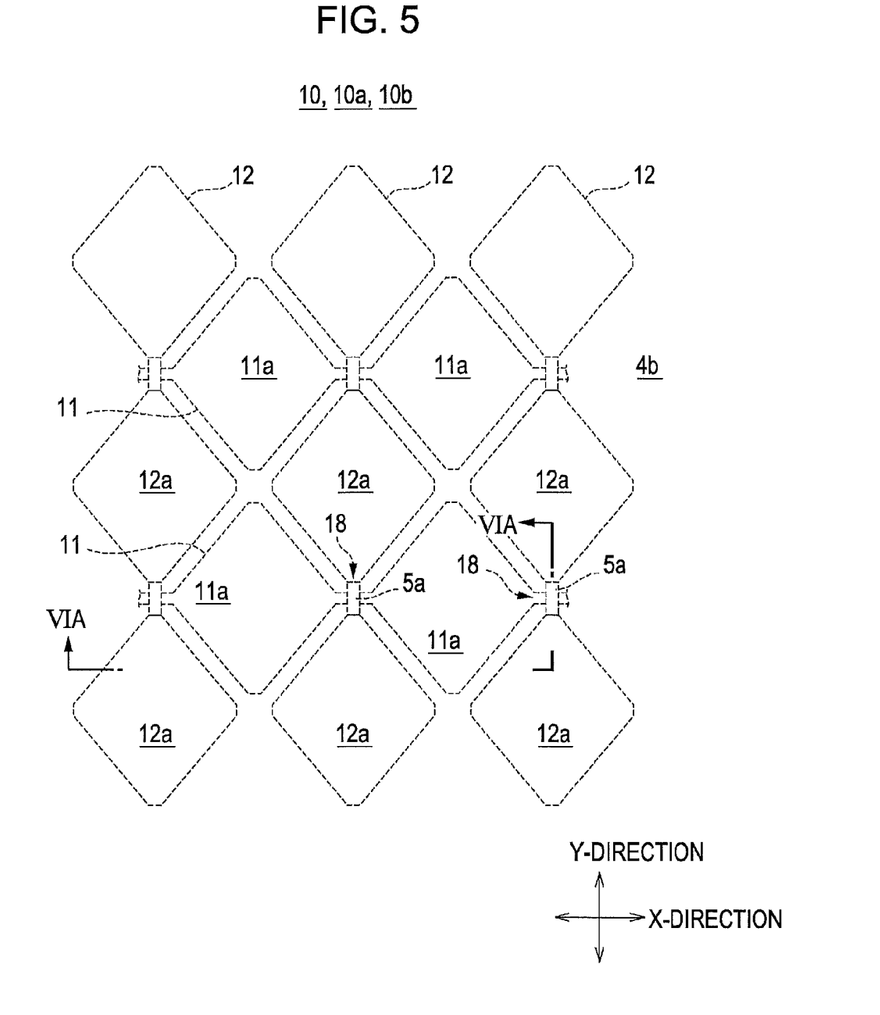
FIG. 5 is a plan view showing the arrangement of first and second translucent electrode lines included in a capacitive input device according to a second embodiment of the present invention.
Figure 6A:
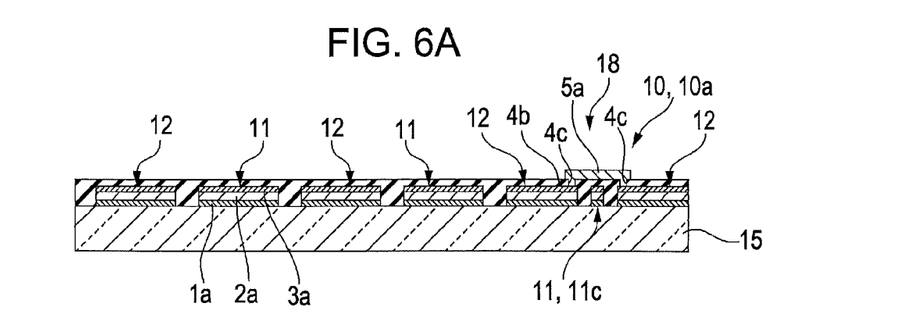
FIG. 6A is a sectional view of the capacitive input device taken along the line VIA-VIA of FIG. 5.
Figure 6B:
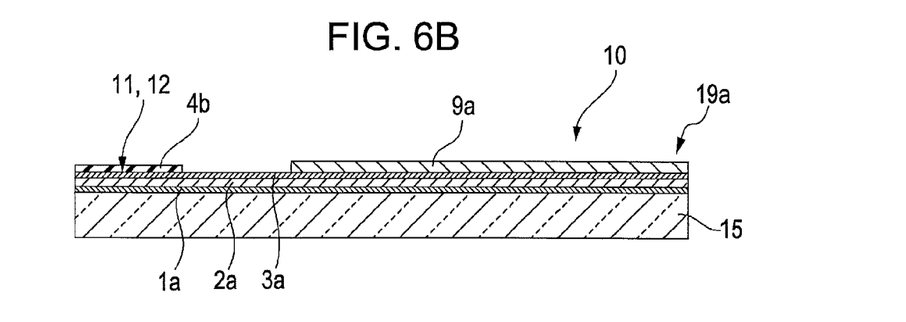
FIG. 6B is a sectional view showing connections between the first and second translucent electrode lines and metal wires included in the capacitive input device according to the second embodiment.

FIG. 5 is a plan view showing the arrangement of first translucent electrode lines 11 and second translucent electrode lines 12 included in a capacitive input device 10 according to a second embodiment of the present invention. FIG. 6A is a sectional view of the capacitive input device 10 taken along the line VIA-VIA of FIG. 5. FIG. 6B is a sectional view showing connections between the first and second translucent electrode lines 11 and 12 and metal wires 9a. A configuration described in this embodiment is similar to that described in the first embodiment. Therefore, components common to the first and second embodiments have the same reference numerals and will not be described in detail.

The capacitive input device 10, as well as that of the first embodiment, is a type of touch panel. With reference to FIGS. 5 and 6A, the capacitive input device 10 includes a translucent substrate 15, made of glass, including an input screen 10b having an input region 10a. The first and second translucent electrode lines 11 and 12 are arranged in the input region 10a. The first translucent electrode lines 11 extend in a first direction and the second translucent electrode lines 12 extend in a second direction intersecting with the first direction. The first and second translucent electrode lines 11 and 12 have a multilayer structure including translucent thin-films, arranged on a surface of the translucent substrate 15, having different refractive indexes. The first and second translucent electrode lines 11 and 12 intersect with each other at intersecting portions 18. Portions of the first translucent electrode lines 11 are connected to each other with the intersecting portions 18. Portions of the second translucent electrode lines 12 are separated from each other with the intersecting portions 18.

A translucent interlayer insulating layer 4b extends over the first and second translucent electrode lines 11 and 12 and the input region 10a. The interlayer insulating layer 4b has contact holes 4c. Relay electrodes 5a extend through the contact holes 4c to electrically connect the second translucent electrode line 12 portions, separated from each other with the intersecting portions 18, to each other. Therefore, the second translucent electrode line 12 portions are electrically connected to each other in the second direction.

The first and second translucent electrode lines 11 and 12, as well as those described in the first embodiment, each include a first ITO layer 1a having a thickness of about 10 to 20 nm, a silicon dioxide layer 2a having a thickness of about 40 to 60 nm, and a second ITO layer 3a having a thickness of about 10 to 20 nm, these layers being arranged in that order. The relay electrodes 5a are connected to the second ITO layers 3a of the second translucent electrode lines 12. The relay electrodes 5a are made of ITO and have a thickness of about 10 to 15 nm. The interlayer insulating layer 4b is made of a photosensitive resin such as an acrylic resin and has a thickness of about 1 to 2 μm.

The first and second translucent electrode lines 11 and 12 have rhombic first pad portions 11a and second pad portions 12a, respectively, located between the intersecting portions 18. The first translucent electrode lines 11 include connecting portions 11c that are narrower than the first and second pad portions 11a and 12a. The relay electrodes 5a are narrower than the first and second pad portions 11a and 12a and have a strip shape.

With reference to FIG. 6B, a plurality of metal wires 9a extend outside the input region 10a and are electrically connected to the first and second translucent electrode lines 11 and 12. The metal wires 9a have terminals 19a, located at ends thereof, connected to a flexible substrate.

Since the first and second translucent electrode lines 11 and 12 include the first ITO layers 1a, the silicon dioxide layers 2a, and the second ITO layers 3a as described above, the metal wires 9a are connected to the second ITO layers 3a of the first and second translucent electrode lines 11 and 12. The relay electrodes 5a are connected to the second ITO layers 3a of the second translucent electrode lines 12.

A method for manufacturing the capacitive input device 10 will now be described. FIGS. 7A to 7E are sectional view showing steps of the method. The first and second translucent electrode lines 11 and 12, the intersecting portions 18, and the metal wires 9a are collectively shown in FIGS. 7A to 7E. Left portions of FIGS. 7A to 7E correspond to FIG. 6A and right portions thereof correspond to FIG. 6B.

Figure 7A:
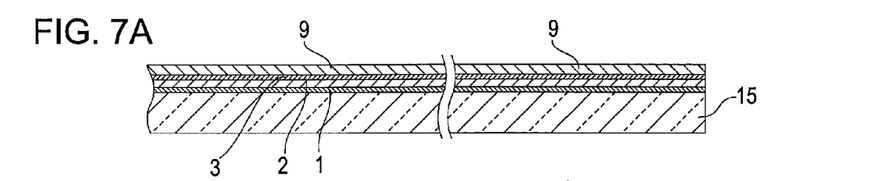
FIGS. 7A to 7E are sectional view showing steps of a method for manufacturing the capacitive input device according to the second embodiment.

In the manufacture of the capacitive input device 10, the following films are first formed on a surface of the translucent substrate 15 in this order as shown in FIG. 7A: a polycrystalline first ITO film 1 with a thickness of about 10 to 20 nm, a silicon dioxide film 2 with a thickness of about 40 to 60 nm, a polycrystalline second ITO film 3 with a thickness of about 10 to 20 nm, and a metal film 9.

Figure 7B:
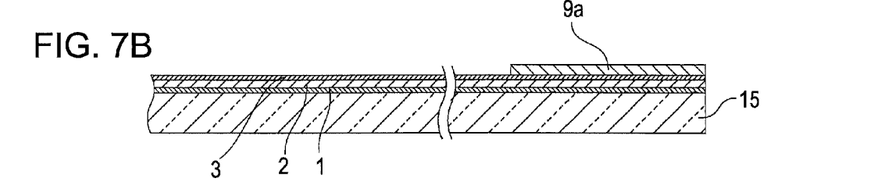

After a first etching mask made of a photosensitive resin or the like is provided on the metal film 9, the metal film 9 is patterned by etching, whereby the metal wires 9a are formed as shown in FIG. 7B. The first etching mask is then removed from the metal wires 9a.

Figure 7C:
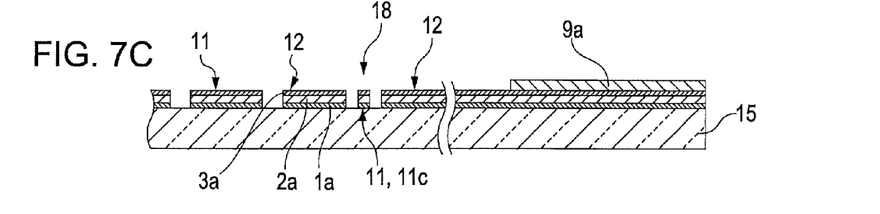

After a second etching mask made of a photosensitive resin or the like is applied over the metal wires 9a and the second ITO film 3, the first ITO film 1, the silicon dioxide film 2, the second ITO film 3 are etched, whereby the first and second translucent electrode lines 11 and 12 are formed as shown in FIG. 7C. The second etching mask is then removed from the metal wires 9a.

Figure 7D:
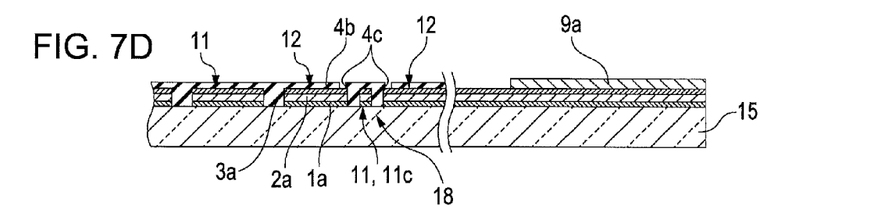

An acrylic resin is applied over the first and second translucent electrode lines 11 and 12 by a coating process, exposed, and then developed, whereby the interlayer insulating layer 4b is formed so as to extend over the intersecting portions 18 as shown in FIG. 7D. In this step, the contact holes 4c are formed in the interlayer insulating layer 4b.

Figure 7E:
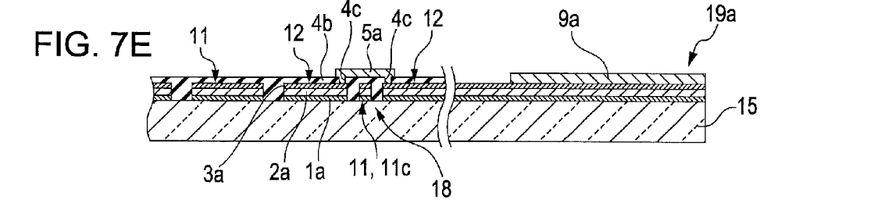

A polycrystalline ITO film is formed over the interlayer insulating layer 4b, a third etching mask made of a photosensitive resin or the like is provided on the polycrystalline ITO film, and the polycrystalline ITO film is then etched, whereby the relay electrodes 5a are formed as shown in FIG. 7E. The first and second translucent electrode lines 11 and 12 are covered with the interlayer insulating layer 4b and therefore prevented from being damaged. An amorphous ITO film may be used instead of the polycrystalline ITO film. In this case, an etching mask made of a photosensitive resin or the like is provided on the amorphous ITO film, which is etched with oxalic acid so as to have a predetermined pattern and then polycrystallized by annealing.

Advantages of this embodiment will now be described. Since the first and second translucent electrode lines 11 and 12, as well as those described in the first embodiment, have the multilayer structure as described above, there is no difference in reflectivity between regions containing the first and second translucent electrode lines 11 and 12 and regions containing no first and second translucent electrode lines 11 and 12. Therefore, the first and second translucent electrode lines 11 and 12 are inconspicuous. The first and second translucent electrode lines 11 and 12 are arranged on one surface of the translucent substrate 15 and formed from the same member. Therefore, the method of this embodiment is simple. The intersecting portions 18 have a small area and a thickness of about 10 to 15 nm and are made of ITO. This allows the intersecting portions 18 to be inconspicuous.

Other Embodiments

In each of the first and second embodiments, the metal wires 9a have the terminals 19a located at ends thereof. ITO layers may be formed on the metal wires 9a together with the relay electrodes 5a instead of the terminals 19a. In the second embodiment, the interlayer insulating layer 4b is formed in the input region 10a. The interlayer insulating layer 4b maybe formed over the input screen 10b except the terminals 19a.

In each of the first and second embodiments, the following films are used to form the multilayer structure: the polycrystalline first ITO film 1 with a thickness of about 10 to 20 nm, the silicon dioxide film 2 with a thickness of about 40 to 60 nm, and the polycrystalline second ITO film 3 with a thickness of about 10 to 20 nm, these films being arranged in that order from the bottom. The following films may be used instead of the above films: a silicon dioxide film having a thickness of about 30 nm and a refractive index of about 1.46 or a silicon oxynitride film having a thickness of about 100 nm and a refractive index of about 1.60 and a polycrystalline ITO film, disposed thereon, having a thickness of about 10 nm. In this case, the region containing the first and second translucent electrode lines 11 and 12 includes portions of the silicon dioxide or silicon oxynitride film and portions of the ITO film and the region containing no first and second translucent electrode lines 11 and 12 includes a portion of the silicon dioxide film, which has a thickness of about 30 nm, or a portion of the silicon oxynitride film, which has a thickness of about 100 nm; hence, there is substantially no difference in reflectivity between these regions.

In the first embodiment, the liquid crystal display 50 is used. An organic electroluminescent display or a plasma display may be used instead of the liquid crystal display 50.

Third Embodiment

Figure 8A:
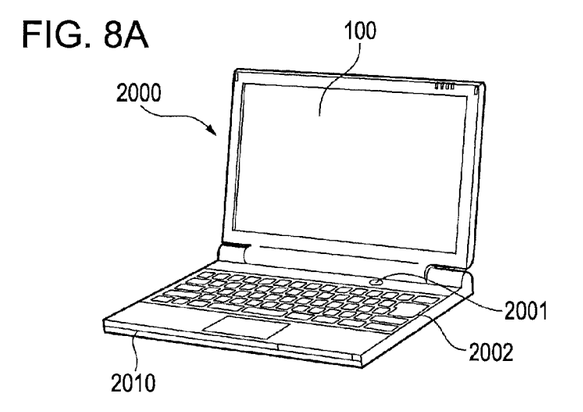
FIG. 8A is an illustration of a mobile personal computer including the capacitive input device according to the first or second embodiment.
Figure 8B:
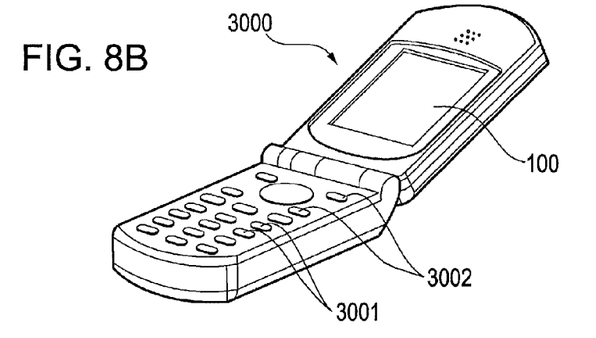
FIG. 8B is an illustration of a mobile phone including the capacitive input device according to the first or second embodiment.
Figure 8C:
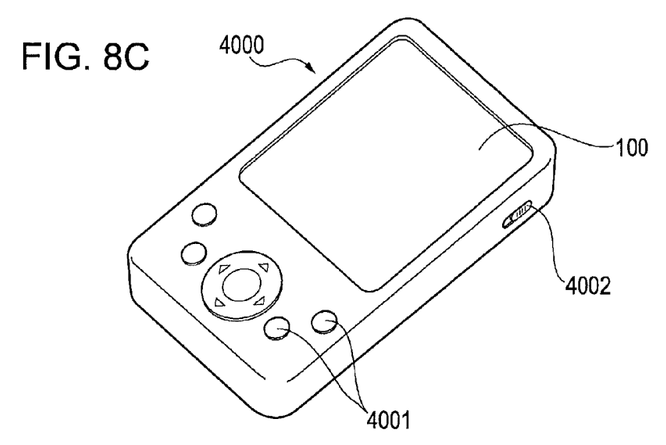
FIG. 8C is an illustration of a personal digital assistant including the capacitive input device according to the first or second embodiment.

Examples of an electronic apparatus including a display unit 100 including the capacitive input device 10 according to the first or second embodiment will now be described. FIG. 8A shows a mobile personal computer 2000. The personal computer 2000 includes the display unit 100 and a body 2010. The body 2010 includes a power switch 2001 and a keyboard 2002. FIG. 8B shows a mobile phone 3000. The mobile phone 3000 includes the display unit 100, a plurality of operation buttons 3001, and a plurality of scroll buttons 3002. The operation of the scroll buttons 3002 allows an image displayed on the display unit 100 to be scrolled. FIG. 8C shows a personal digital assistant (PDA) 4000. The PDA 400 includes the display unit 100, a plurality of operation buttons 4001, and a power switch 4002. The operation of the power switch 4002 allows various pieces of information, such as addresses and schedule tables, to be displayed on the display unit 100.

Examples of the electronic apparatus include digital still cameras, liquid crystal televisions, viewfinder-type or direct view-type video tape recorders, car navigation systems, pagers, electronic notebooks, portable electronic calculators, word processors, work stations, video phones, point-of-sale (POS) terminals, and apparatuses having touch panels. The display unit 100 is used as a display section of each electronic apparatus described above.

What is claimed is:

1. A capacitive input device comprising:
   a translucent substrate having an input region;
   first translucent electrode lines, arranged in the input region, extending in a first direction;
   second translucent electrode lines, arranged in the input region, extending in a second direction intersecting with the first direction;
   interlayer insulating layers composed of acrylic resins and having a thickness ranging from about 1-2 μm; and
   relay electrodes composed of ITO and having a thickness ranging from about 10-15 nm;
   wherein the first and second translucent electrode lines are disposed on a surface of the translucent substrate, the first translucent electrode lines intersect with the second translucent electrode lines at intersecting portions, portions of one of each first translucent electrode line and each second translucent electrode line are connected to each other with the intersecting portions, portions of the other are separated from each other with the intersecting portions, the interlayer insulating layers overlie the first or second translucent electrode line portions connected to each other with the intersecting portions, and the relay electrodes overlie the interlayer insulating layers to electrically connect the first or second translucent electrode line portions, separated from each other with the intersecting portions, to each other,
   wherein the first and second translucent electrode lines are configured to have refractive indices and thicknesses such that a first area of the input region that is covered by the first and second translucent electrode lines has at least substantially the same reflectivity as a second area of the input region that is not covered by the first and second translucent electrode lines,
   wherein the first and second translucent electrode lines are formed from a multilayer film including thin-films having different refractive indexes,
   wherein one of the translucent thin-films is a translucent conductive metal oxide layer and another one thereof is a translucent silicon compound layer, and
   wherein the translucent substrate is made of glass and the multilayer film includes a first ITO layer with a thickness of about 10 to 20 nm, a silicon dioxide layer with a thickness of about 40 to 60 nm, and a second ITO layer with a thickness of about 10 to 20 nm, these layers being arranged in that order.

2. The capacitive input device according to claim 1, wherein the first and second translucent electrode lines are formed from the same member.

3. The capacitive input device according to claim 1, wherein the first and second translucent electrode lines have first large-area portions and second large-area portions, respectively, each located between the intersecting portions, and the first or second translucent electrode line portions connected to each other with the intersecting portions are narrower than the first and second large-area portions.

4. The capacitive input device according to claim 1, wherein the relay electrodes each include a translucent conductive metal oxide film.

5. The capacitive input device according to claim 1, further comprising a plurality of metal wires which are connected to the first and second translucent electrode lines and which extend outside the input region.

6. The capacitive input device according to claim 1, wherein the interlayer insulating layers are provided only at the intersecting portions.

* * * * *